United States Patent [19]

Nagai et al.

[11] Patent Number: 4,529,524
[45] Date of Patent: Jul. 16, 1985

[54] PROCESS FOR PRODUCING PLATE-LIKE BARIUM FERRITE PARTICLES FOR MAGNETIC RECORDING

[75] Inventors: Norimichi Nagai; Nanao Horiishi, both of Hiroshima; Masao Kiyama; Toshio Takada, both of Kyoto, all of Japan

[73] Assignee: Toda Kogyo Corp., Hiroshima, Japan

[21] Appl. No.: 666,253

[22] Filed: Oct. 29, 1984

[30] Foreign Application Priority Data

Dec. 26, 1983 [JP] Japan ................. 58-247520

[51] Int. Cl.³ .................................. C04B 35/26
[52] U.S. Cl. ........................ 252/62.59; 252/62.62; 252/62.63
[58] Field of Search ............... 252/62.59, 62.62, 62.63

[56] References Cited

U.S. PATENT DOCUMENTS 4,309,459  1/1982  Tokuoka ................. 252/62.59 X
4,341,648  7/1982  Kubo et al. ............. 252/62.59 X
4,414,124 11/1983  Endo et al. ............. 252/62.69 X

FOREIGN PATENT DOCUMENTS 57-56904   4/1982  Japan ................. 252/62.63
57-198604 12/1982  Japan ................. 252/62.63
58-56303   4/1983  Japan ................. 252/62.63

Primary Examiner—Jack Cooper
Attorney, Agent, or Firm—Lyon & Lyon

[57] ABSTRACT

Disclosed herein is a process for producing plate-like barium ferrite particles for magnetic recording, represented by the formula:

$$BaFe_{12-x-y}M_xTi_yO_{19}$$

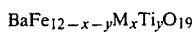

wherein x and y are independently not more than 1.2 and M is Co(II) or Co(II) and a divalent metal other than Co, which comprises adding a compound of Si(IV) to an aqueous highly alkaline suspension of ferric hydroxide containing Ti(IV), Ba(II) and Co(II) or Co(II) and a divalent metal other than Co as M(II), and autoclaving the resultant aqueous highly alkaline suspension of ferric hydroxide at the temperature of 200° to 330° C., thereby obtaining the plate-like barium ferrite particles having the thickness thereof controlled according to the atomic ratio of Si(IV) to Fe(III).

14 Claims, 1 Drawing Figure

PROCESS FOR PRODUCING PLATE-LIKE BARIUM FERRITE PARTICLES FOR MAGNETIC RECORDING

BACKGROUND OF THE INVENTION

The present invention relates to a process for producing plate-like barium ferrite particles for magnetic recording, and in more detail, relates to a process for producing plate-like barium ferrite particles for magnetic recording, represented by the formula:

$$BaFe_{12-x-y}M_xTi_yO_{19}$$

wherein x and y are independently not more than 1.2 and M is Co(II) or Co(II) and a divalent metal other than Co, which comprises adding a compound of Si(IV) to an aqueous highly alkaline suspension of ferric hydroxide containing Ti(IV), Ba(II) and Co(II) or Co(II) and a divalent metal other than Co as M(II), is such an amount that the atomic ratio of Si(IV) to Fe(III) is in the range of 0.0025 to 0.036, and autoclaving the resultant aqueous highly alkaline suspension of ferric hydroxide at the temperature of 200° to 300° C., thereby obtaining the plate-like barium ferrite particles having the thickness thereof controlled according to the atomic ratio of Si(IV) to Fe(III).

In recent years, accompanying with the propagation of VTR audio component, word processor and computor, non-acicular ferromagnetic particles of a favorable dispersibility provided with a suitable coercive force (Hc) and a large magnetization (M) have been required as the magnetic material for recording, particularly as the magnetic material for the perpendicular magnetic recording.

In general, as a method for producing barium ferrite particles, a method of treating an aqueous alkaline suspension containing Ba(II) and Fe(III) in an autoclave as a reactor (the method is hereinafter referred to as "the autoclaving method") has been known, and by selecting the reaction conditions in the autoclaving method, barium ferrite particles precipitate.

The thus precipitated particles are hexagonal plate-like particles, and the distribution of the particle size and the average size of the particles vary according to the reaction conditions, and in result, the particles have a different magnetic properties.

In addition, one of the factors which contribute the favorable dispersibility of the particles is that a width/thickness ratio (the ratio of the average diameter of the c-plane of the crystal of the particle (width of the particle) to the thickness of c-axial direction of the crystal thereof) is in a certain specified range, and for producing the particle of a favorable dispersibility, it is demanded to offer a method for freely controllig the thickness of the particle corresponding to the average diameter (width) of the produced plate-like particles.

As a result of the present inventor's studies for finding a method of freely controlling the thickness of the plate-like barium ferrite particle formed by the autoclaving method so as to obtain plate-like barium ferrite particles which are favorable as magnetic powdery particles for use in magnetic recording, the present inventors have found the followings.

Namely, in the process for producing plate-like barium ferrite particles by autoclaving an aqueous highly alkaline suspension of ferric hydroxide containing Ba(II), Ti(IV) and at least Co(II) as M(II) at a temperature in a range of from 200° to 330° C., the thickness of the thus formed plate-like barium ferrite particles of $BaFe_{12-x-y}M_xTi_yO_{19}$ wherein x, y and M are as defined above, can be freely controlled by preliminarily adding a compound of Si(IV) to the aqueous alkaline suspension of ferric hydroxide, in such an amount that the atomic ratio of Si(IV) to Fe(III) is in a range of 0.0025 to 0.036.

The present inventors have attained the present invention based on the above-mentioned finding.

SUMMARY OF THE INVENTION

In the first aspect of the present invention, there is provided a process for producing plate-like barium ferrite particles for magnetic recording, represented by the formula:

$$BaFe_{12-x-y}M_xTi_yO_{19}$$

wherein x and y are independently not more than 1.2 and M is Co(II) or Co(II) and a divalent metal other than Co, which comprises adding a compound of Si(IV) to an aqueous highly alkaline suspension of ferric hydroxide containing Ti(IV), Ba(II) and Co(II) or Co(II) and a divalent metal other than Co as M(II), in such an amount that the atomic ratio of Si(IV) to Fe(III) is in the range of 0.0025 to 0.036, and autoclaving the resultant aqueous highly alkaline suspension of ferric hydroxide at the temperature of 200° to 330+ C., thereby obtaining the plate-like barium ferrite particles having the thickness thereof controlled according to the atomic ratio of Si(IV) to Fe(III).

In the second aspect of the present invention, there is provided a process for producing plate-like barium ferrite particles for magnetic recording, represented by the formula:

$$BaFe_{12-x-y}M_xTi_yO_{19}$$

wherein x and y are independently not more than 1.2 and M is Co(II) or Co(II) and a divalent metal other than Co, which comprises adding a compound of Si(IV) to an aqueous highly alkaline suspension of ferric hydroxide containing Ti(IV), Ba(II) and Co(II) or Co(II) and a divalent metal other than Co as M(II), in such an amount that the atomic ratio of Si(IV) to Fe(III) is in the range of 0.0025 to 0.036, autoclaving the resultant aqueous highly alkaline suspension of ferric hydroxide at the temperature of 200° to 300° C. to obtain the plate-like barium ferrite particles having the thickness thereof controlled according to the atomic ratio of Si(IV) to Fe(III), and subjecting the thus obtained particles to thermal treatment at a temperature of not more than 900° C.

BRIEF EXPLANATION OF DRAWING

Of the attached drawing.

DETAILED DESCRIPTION OF THE INVENTION

Figure 1:
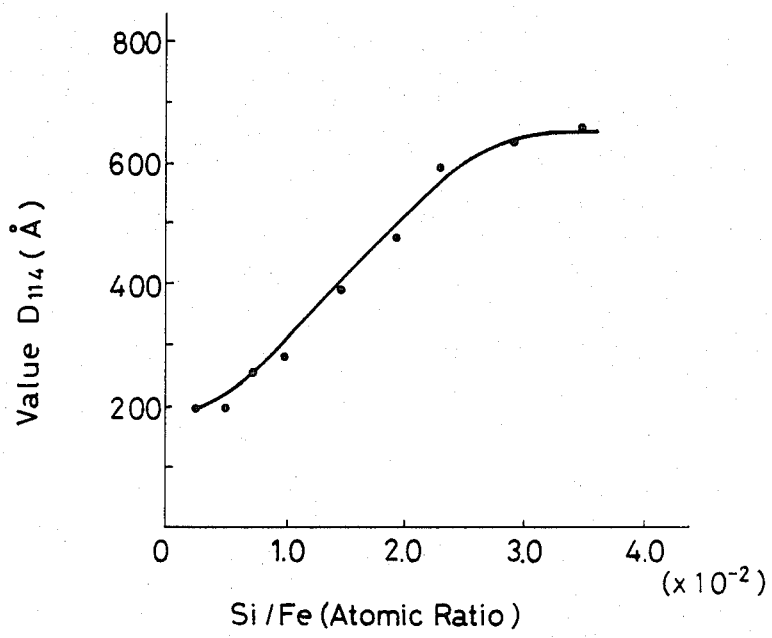
FIG. 1 shows the relationship between the amount of sodium silicate according as the atomic ratio of Si(IV) to Fe(III) in the aqueous suspension and the thickness of the plate-like barium ferrite particles formed by autoclaving method in the aqueous solution, the thickness being represented by the value $D_{114}$ measured by X-ray diffraction method.

According to the process of the present invention, plate-like barium ferrite particles represented by the formula:

$$BaFe_{12-x-y}M_xTi_yO_{19}$$

wherein x and y are independently not more than 1.2 and preferably x is equal to y, and M is Co(II) or Co(II) and a divalent metal other than Co, having the thickness controlled according to the atomic ratio of Si(IV) to Fe(III), are produced by adding a compound of Si(IV) to an aqueous highly alkaline suspension of ferric hydroxide containing Ti(IV), Ba(II) and at least Co(II) as M(II), in such an amount that the atomic ratio of Si(IV) to Fe(III) is in the range of 0.0025 to 0.036, and autoclaving the resultant aqueous highly alkaline suspension of ferric hydroxide at the temperature of 200° to 330° C.

In more detail, the compound of Si(IV) is added to the aqueous highly alkaline suspension of ferric hydroxide containing Ti(IV), Ba and as M(II), Co(II) or Co(II) and a divalent metal other than Co such as Zn(II) and Mn(II), wherein the atomic ratio of total sum of M(II) and Ti(IV) to Fe(III) is 0.01:1 to 0.25:1 and preferably the atomic amount of M(II) is the same as that of Ti(IV), and wherein the atomic ratio of Si(IV) to Fe(III) is in the range of 0.0025 to 0.036, and then the resultant aqueous highly alkaline suspension of ferric hydroxide is autoclaved at a temperature of 200° to 300° C., preferably 240° to 300° C.

As Fe(III) in the present invention, ferric chloride, ferric nitrate and powdery ferric oxyhydroxide may be used.

As Ba(II) in the present invention, barium hydroxide and barium nitrate and the barium chlolide may be used.

As Co(II) in the present invention, cobalt nitrate and cobalt chloride may be used, and as Ti(IV) in the present invention, titanium chloride and alkali titanate may be used.

As to Si(IV), in the present invention, a water-soluble silicate such as sodium silicate and potassium silicate may be used.

As to Zn(II) in the present invention, zinc nitrate and zinc chloride may be used and as to Mn(II) in the present invention, manganese nitrate and manganese chloride may be used.

The autoclaving treatment of the present invention may be carried out at any temperature which is lower than the critical temperature of the aqueous solution, and particularly the reaction temperature of 200° to 300° C. is suitable for an economic production of the ferrite.

The following is the explanation of the representative examples of the numerous experiments carried out by the present inventors.

Of the attached drawing, FIG. 1 shows the relationship between the atomic ratio of Si(IV) to Fe(III) which is the amount of sodium silicate added to the aqueous highly alkaline suspension of ferric hydroxide and the value of $D_{114}$ as the representative value of the thickness of the plate-like barium ferrite particle according to the present invention measured by X-ray diffraction method. As is clearly seen in FIG. 1, there is an increasing tendency of the thickness of the particle as the ratio becomes larger (i.e. as the amount of addition of sodium silicate increases).

The amount of addition of the compound of Si(IV) is adjustable to the range of giving the atomic ratio of Si(IV) to Fe(III) in the range of from 0.0025 to 0.036.

In the case of the atomic ratio of below 0.0025, it is hardly possible to attain the effect of controlling the thickness of the plate-like particle, which is the objective of the present invention.

On the other hand, in the case of the atomic ratio of over 0.036, there is a tendency that the effect of increasing the thickness of the plate-like particle becomes not so much remarkable, and minute amorphous particles appear among the plate-like barium ferrite particles.

Si(IV) participates in the thickness of the plate-like barium ferrite particle formed by the autoclaving method and accordingly, it is necessary to add Si(IV) to the aqueous highly alkaline suspension before the beginning of the reaction of forming the plate-like barium ferrite particles, and the compound of Si(IV) may be added preliminarily to the raw material for Ba(II), the raw material for Fe(III), the raw material for M(II), the raw material for Ti(IV) or alkaline ferric hydroxide.

The plate-like barium ferrite particles of $BaFe_{12-x-y}M_xTi_yO_{19}$ wherein x, y and M are as defined above, obtained by autoclaving the aqueous highly alkaline suspension of ferric hydroxide containing Ba(II), M(II), Ti(IV) and Si(IV) show a coercive force (Hc) in a range of from 500 to 1000 Oe and can be used as the magnetic particles for use in magnetic recording.

The plate-like barium ferrite particles of $BaFe_{12-x-y}M_xTi_yO_{19}$ wherein x, y and M are as defined above, show a magnetization (M) of less than about 40 emu/g when x is higher than 0.3.

In order to improve the magnetization (M) of the plate-like barium ferrite particles of $BaFe_{12-x-y}M_xTi_yO_{19}$ wherein x, y and M are as defined above, obtained by the autoclaving method, the plate-like barium ferrite particles having a high magnetization (M) without remarkable change on the form and shape as well as a BET specific surface area(S) are formed by subjecting the plate-like barium ferrite particles obtained by the autoclaving method to the thermal treatment at a temperature of not more than 900° C.

Since the plate-like barium ferrite particles represented by the formula:

$$BaFe_{12-x-y}M_xTi_yO_{19}$$

wherein x, y and M are as defined above contain Si(IV), the growth of the particles and the mutual sintering of the particles during the thermal treatment at a temperature as high as 900° C. are remarkably hindered.

Although the temperature at which the sintering of the particles begins, depends on the kind of atmosphere, and the atomic ratio of Si(IV) to Fe(III) in the suspension, the mutual sintering of the particles begins at a temperature of more than 900° C. Accordingly, the thermal treatment of the particles is to be carried out at a temperature of 900° C. or lower than 900° C., preferably, 700° to 860° C.

The present invention will be explained in more detail while referring to the non-limitative Examples and Comparative Example as follows.

In addition, the average diameter (width) of the particle in the experimental examples, Examples and Comparative Examples was measured on the electronmicrograph of the particles; the thickness of the particle therein was shown as the half value width of $D_{114}$ measured by X-ray diffraction method; the specific surface area(S) of the particles was that measured by BET method while using $N_2$; the magnetization(M) was measured in a magnetic field of 10 KOe and the coercive force(Hc) was measured at a packing density of 1.6 $g/cm^3$.

EXAMPLE 1

Into 20 liters of decarbonized water in an autoclave, 14 mols of $Fe(NO_3)_3$, 1 mol of $Co(NO_3)_2$, 1 mol of $TiOSO_4$, 1.76 mols of $BaCl_2$, 21 g of sodium silicate No. 3 (content of $SiO_2$ of 28.55% by weight) which corresponds to the atomic ratio of Si(IV) to Fe(III) of 0.007 and 172 mols of sodium hydroxide were added, and after heating the mixture to 300° C., the mixture was kept at the temperature for 5 hours under a mechanical stirring, thereby forming a ferromagnetic precipitate of yellowish-brown in colour. After cooling the reaction mixture to room temperature, the precipitate was collected by filtration, washed thoroughly with water to remove Ba(II) adsorbed thereon and dried.

The thus obtained yellowish-brown ferromagnetic plate-like particles showed an average diameter (width) of 0.1 micrometer, a thickness of 260 Å, a specific surface area(S) of 40 $m^2/g$, a magnetization (M) of 32.8 emu/g and a coercive force (Hc) of 185 Oe and were identified as $BaFe_{10.5}Co_{0.75}Ti_{0.75}O_{19}$ as a result of fluorescent X-ray analysis.

The thus obtained ferromagnetic particles were subjected to the thermal treatment in air at 800° C. to obtain the ferromagnetic particles of $BaFe_{10.5}Co_{0.75}Ti_{0.75}O_{19}$ of an average diameter (width) of 0.1 micrometer, a thickness of 300 Å, a specific surface area(S) of 28.4 $m^2/g$, a magnetization (M) of 53.2 emu/g and a coercive force (Hc) of 890 Oe. According to electromicroscopic observation, the mutual sintering of plate-like barium ferrite particles had been hindered.

EXAMPLE 2

Into 20 liters of decarbonized water in an autoclave, 14 mols of $Fe(NO_3)_3$, 1.2 mols of $Co(NO_3)_2$, 1.2 mols of $TiCl_4$, 1.76 mols of $BaCl_2$, 42.4 g of sodium silicate No. 3 (content of $SiO_2$ of 28.55% by weight) which corresponds to the atomic ratio of Si(IV) to Fe(III) of 0.0144 and 173 mols of sodium hydroxide were added, and after heating the mixture to 270° C., the mixture was kept at the temperature for 5 hours under a mechanical stirring, thereby a ferromagnetic precipitate of yellowish-brown in colour was formed.

After cooling the reaction mixture to room temperature, the thus formed precipitate was collected by filtration, washed well with water to remove the adsorbed Ba(II) and dried.

The thus obtained yellowish-brown ferromagnetic plate-like particles showed an average diameter (width) of 0.1 micrometer, a thickness of 391 Å and a specific surface area (S) of 36.2 $m^2/g$ and were identified as $BaFe_{10.2}Co_{0.9}Ti_{0.9}O_{19}$ as a result of fluorescent X-ray analysis. The ferromagnetic particles showed a magnetization (M) of 31.2 emu/g and a coercive force(Hc) of 102 Oe.

The yellowish-brown ferromagnetic particles were subjected to the thermal treatment in air at 800° C.

The thus obtained ferromagnetic particles of $BaFe_{10.2}Co_{0.9}Ti_{0.9}O_{19}$ showed an average diameter (width) of 0.1 micrometer, a thickness of 410 Å, a specific surface area(S) of 26.6 $m^2/g$, a magnetization(M) of 53.8 emu/g and a coercive force (Hc) of 890 Oe.

According to the result of electronmicroscopic observation, the mutual sintering of plate-like barium ferrite particles had been hindered.

EXAMPLE 3

Into 20 liters of decarbonized water in an autoclave, 14 mols of $Fe(NO_3)_3$, 1.4 mols of $Co(NO_3)_2$, 1.4 mols of $TiCl_4$, 1.76 mols of $BaCl_2$, 97.5 g of sodium silicate No. 3 (containing $SiO_2$ of 28.55% by weight) corresponding to the atomic ratio of Si(IV) to Fe(III) of 0.0331 and 175 mols of sodium hydroxide were added, and after heating the mixture to 280° C., the mixture was kept at the temperature for 5 hours under mechanical stirring, thereby a ferromagnetic precipitate of yellowish-brown in colour was formed.

After cooling the reaction mixture to room temperature, the precipitate was collected by filtration, washed well with water to remove the adsorbed Ba(II), and dried.

The thus obtained yellowish-brown ferromagnetic plate-like particles showed an average diameter (width) of 0.1 micrometer, a thickness of 600 Å, a specific surface area(S) of 22.3 $m^2/g$, a magnetization(M) of 28.9 emu/g, a coercive force (Hc) of 131 Oe, and were identified as $BaFe_{10.0}Co_{1.0}Ti1.0O_{19}$ as a result of fluorescent X-ray analysis.

The yellowish-brown ferromagnetic particles were subjected to thermal treatment in air at 820° C., and the thus obtained ferromagnetic particles of $BaFe_{10.0}Co_{1.0}Ti_{1.0}O_{19}$ showed an average diameter (width) of 0.1 micrometer, a thickness of 602 Å, a specific surface area(S) of 21.1 $m^2/g$, a magnetization of 54.1 emu/g and a coercive force(Hc) of 910 Oe. Acccording to the result of the electronmicroscopic observation, the mutual sintering of plate-like barium ferrite particles had been hindered.

COMPARATIVE EXAMPLE 1

In the same manner as in Example 2 except for not adding sodium silicate to the suspension, a ferromagnetic precipitate of yellowish-brown in colour was formed by autoclaving method.

The yellowish-brown ferromagnetic plate-like particles obtained by treating the precipitate in the same manner as in Example 1 showed an average diameter(width) of 0.1 micrometer, a thickness of 182 Å and a specific surface area(S) of 54.1 $m^2/g$, and as a result of fluorescent X-ray analysis, was identified as $BaFe_{10.2}Co_{0.9}Ti_{0.9}O_{19}$.

What is claimed is:

1. A process for producing plate-like barium ferrite particles for magnetic recording exhibiting an $H_c$ of 500 to 1,000 Oe, represented by the formula:

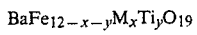

$$BaFe_{12-x-y}M_xTi_yO_{19}$$

wherein x and y are independently not more than 1.2 and M is Co(II) or Co(II) and a divalent metal other than Co, said divalent metal being Zn(II) or Mn(II), which comprises adding a compound of Si(IV) to an aqueous highly alkaline suspension of ferric hydroxide containing Ti(IV), Ba(II) and Co(II) or Co(II) and the divalent metal other than Co as M(II), in such an amount that the atomic ratio of Si(IV) to Fe(III) is in the range of 0.0025 to 0.036, and autoclaving the resultant aqueous highly alkaline suspension of ferric hydroxide at the temperature of 200° to 330° C., thereby obtaining the plate-like barium ferrite particles having the thickness thereof controlled according to the atomic ratio of Si(IV) to Fe(III).

2. A process according to claim 1, wherein in the aqueous highly alkaline suspension the atomic ratio of total sum of M(II) and Ti(IV) to Fe(III) is 0.01:1 to 0.25:1.

3. A process according to claim 1, wherein the source of Fe(III) is ferric chloride, ferric nitrate or powdery ferric oxyhydroxide.

4. A process according to claim 1, wherein the source of Ba(II) is barium hydroxide, barium nitrate or barium chloride.

5. A process according to claim 1, wherein the source of Co(II) is cobalt nitrate or cobalt chloride.

6. A process according to claim 1, wherein the source of Ti(IV) is titanium chloride or alkali titanate.

7. A process according to claim 1, wherein x is equal to y.

8. A process for producing plate-like barium ferrite particles for magnetic recording exhibiting an $H_c$ of 500 to 1,000 Oe, represented by the formula:

$$BaFe_{12-x-y}M_xTi_yO_{19}$$

wherein x and y are independently not more than 1.2 and M is Co(II) or Co(II) and a divalent metal other than Co, said divalent metal being Zn(II) or Mn(II), which comprises adding a compound of Si(IV) to an aqueous highly alkaline suspension of ferric hydroxide containing Ti(IV), Ba(II) and Co(II) or Co(II) and the divalent metal other than Co as M(II), in such an amount that the atomic ratio of Si(IV) to Fe(III) is in the range of 0.0025 to 0.036, autoclaving the resultant aqueous highly alkaline suspension of ferric hydroxide at the temperature of 200° to 300° C., thereby obtaining the plate-like barium ferrite particles having the thickness thereof controlled according to the atomic ratio of Si(IV) to Fe(III), and subjecting the thus obtained particles to thermal treatment at a temperature of not more than 900° C. to improve the magnetization of said particles.

9. A process according to claim 8, wherein in the aqueous highly alkaline suspension the atomic ratio of total sum of M(II) and Ti(IV) to Fe(III) is 0.01:1 to 0.25:1.

10. A process according to claim 8, wherein the source of Fe(III) is ferric chloride, ferric nitrate or powdery ferric oxyhydroxide.

11. A process according to claim 8, wherein the source of Ba(II) is barium hydroxide, barium nitrate or barium chloride.

12. A process according to claim 8, wherein the source of Co(II) is cobalt nitrate or cobalt chloride.

13. A process according to claim 8, wherein the source of Ti(IV) is titanium chloride or alkali titanate.

14. A process according to claim 8, wherein x is equal to y.

* * * * *